United States Patent
Paek

(10) Patent No.: US 7,051,601 B1
(45) Date of Patent: May 30, 2006

(54) TORQUE SENSOR FOR VEHICLE STEERING SYSTEM

(75) Inventor: Seung-Ho Paek, Uijeongbu-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/045,369

(22) Filed: Jan. 31, 2005

(30) Foreign Application Priority Data

Dec. 10, 2004 (KR) ........................ 10-2004-0104194

(51) Int. Cl.
*G01L 3/02* (2006.01)

(52) U.S. Cl. ................................. 73/862.193

(58) Field of Classification Search .................. None
See application file for complete search history.

(56) References Cited

U.S. PATENT DOCUMENTS

| | | | | |
|---|---|---|---|---|
| 4,713,590 A | * | 12/1987 | Ohno | 318/254 |
| 4,805,463 A | * | 2/1989 | Kelledes et al. | 73/862.331 |
| 5,419,206 A | * | 5/1995 | Kamioka et al. | 73/862.333 |
| 5,708,216 A | * | 1/1998 | Garshelis | 73/862.335 |
| 5,796,014 A | * | 8/1998 | Chikaraishi et al. | 73/862.331 |
| 6,456,090 B1 | * | 9/2002 | Ishikawa et al. | 324/546 |
| 6,807,871 B1 | * | 10/2004 | Paek | 73/862.339 |

FOREIGN PATENT DOCUMENTS

JP 8-68703 3/1996

OTHER PUBLICATIONS

English Language Abstract of JP 8-68703.
U.S. Appl. No. 11/045,338 to Seung-Ho Paek, filed Jan. 31, 2005.
U.S. Appl. No. 11/045,332 to Seung-Ho Paek, filed Jan. 31, 2005.

* cited by examiner

*Primary Examiner*—Max Noori
*Assistant Examiner*—Octavia Davis
(74) *Attorney, Agent, or Firm*—Greenblum & Bernstein, P.L.C.

(57) ABSTRACT

A torque sensor for a vehicle steering system having a power source, an oscillator and an offset voltage circuit part includes a current amplifier, first and second coils that are in series and connected at both ends thereof to output terminals of said current amplifier and said offset voltage circuit part, respectively, and first and second resistances that are in series and connected in parallel to said first and second coils. The torque sensor further includes first and second waveform selecting parts, first and second peak detectors, a first differential amplifier, and a first voltage-current converter.

2 Claims, 3 Drawing Sheets

TORQUE SENSOR FOR VEHICLE STEERING SYSTEM

CROSS-REFERENCE TO RELATED APPLICATIONS

The present application is based on, and claims priority from, Korean Application Serial Number 10-2004-0104194, filed on Dec. 10, 2004, the disclosure of which is hereby incorporated by reference herein in its entirety.

FIELD OF THE INVENTION

The present invention relates to a torque sensor for a vehicle steering system adapted to prevent a distortion phenomenon of a torque detecting signal due to a temperature variation of a coil part of the torque sensor or the like.

BACKGROUND OF THE INVENTION

Generally, an Electronic Control Unit (ECU) of an Electrical Power Steering (EPS) system controls the steering of a vehicle by detecting steering torque according to the manipulation of a steering wheel of a driver through a torque sensor.

In the torque sensor of the EPS system, an output waveform of the torque detecting coil is sampled through a sampling pulse circuit.

The phase and amplitude of the output signal vary according to an impedance variation of the torque detecting coil. When a phase variation occurs due to environmental effect such as a temperature variation, or the like if a precise sampling of the signal is not executed, reliability of the torque sensor deteriorates by, for example, a distortion phenomenon of the torque detecting signal.

SUMMARY OF THE INVENTION

Embodiments of the present invention are provided to prevent a distortion phenomenon of a torque detecting signal caused by a variations of the amplitude and phase of an output signal of a coil part (temperature correcting coil and torque detecting coil) due to a temperature variation of the coil part of a torque sensor for a steering system or the like.

A torque sensor for a vehicle steering system includes a power source that supplies power. An oscillator oscillates by receiving a voltage from the power source. An offset voltage circuit part generates an offset voltage by using the voltage applied from the power source. A current amplifier outputs an alternating current voltage which is in-phase with a voltage outputted from the oscillator. First and second coils are in series and connected at both ends thereof to output terminals of the current amplifier and the offset voltage circuit part, respectively. First and second resistances are in series and connected in parallel to the first and second coils. First and second waveform selecting parts receive an alternating current voltage from a contact part of the first and second resistances and from a contact part of the first and second coils, respectively, and then select and output a half-period of the alternating current voltage. First and second peak detectors detect a peak value of each output voltage of the first and second waveform selecting parts. A first differential amplifier executes differential amplification by receiving voltages from the first and second peak detectors. A first voltage-current converter outputs a torque signal by converting a voltage, which is outputted from the first differential amplifier, into a current.

The torque sensor further includes third and fourth resistances that are in series and connected in parallel to the first and second coils. Third and fourth waveform selecting parts receive an alternating current voltage from a contact part of the third and fourth resistances and a contact part of the first and second coils, respectively, and then select and output a half-period of the alternating current voltage. Third and fourth peak detectors detect a peak value of each output voltage of the third and fourth waveform selecting parts. A second differential amplifier executes differential amplification by receiving voltages from the third and fourth peak detectors. A second voltage-current converter outputs a fail-safe torque signal by converting a voltage, which is outputted from the second differential amplifier, into a current.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
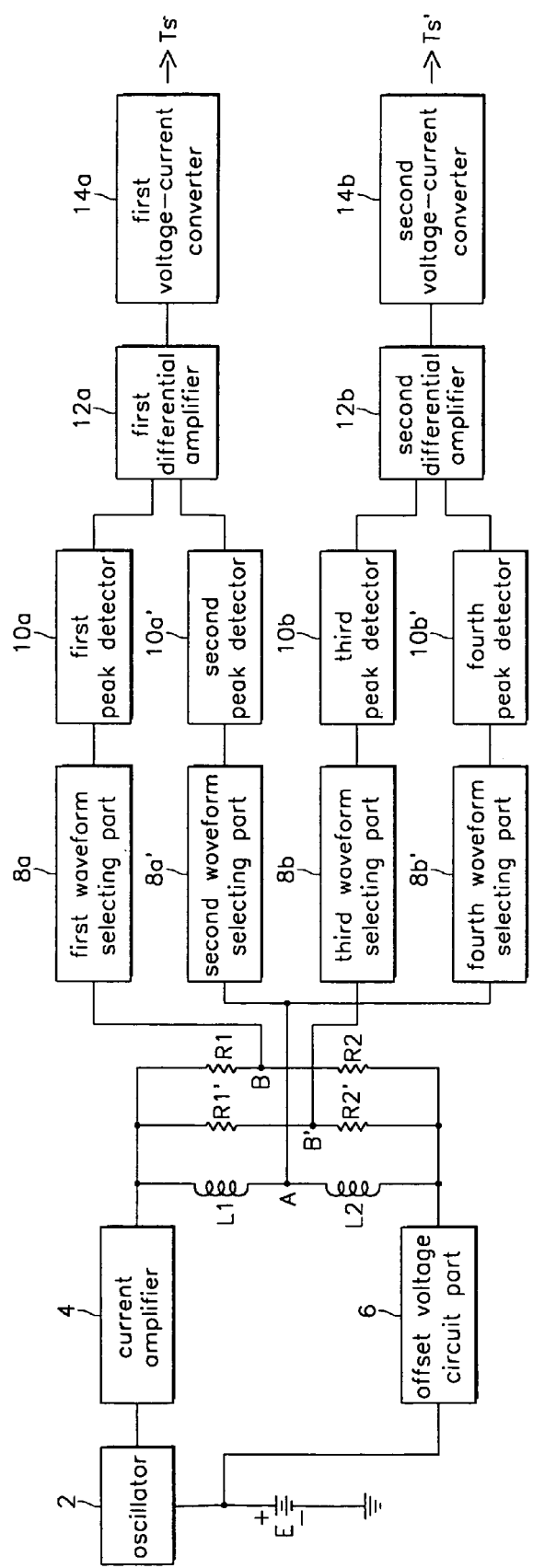
FIG. 1 is a block diagram of a torque sensor for a steering system according to an embodiment of the present invention.

Referring to FIG. 1, an embodiment of the present invention is provided to prevent a distortion phenomenon of a torque detecting signal caused by variations of a phase and amplitude of a signal outputted from a coil part (temperature correcting coil and torque detecting coil) due to a temperature variation of the coil part of a torque sensor for a steering system or the like. This is achieved by selecting a waveform and detecting a peak value after oscillating an applied voltage.

The torque sensor according to the embodiment of the present invention includes a power source (E) that supplies power. An oscillator 2 oscillates by receiving a voltage from the power source (E). An offset voltage circuit part 6 generates an offset voltage (Voffset) by using the voltage applied from the power source (E). A current amplifier 4 outputs an alternating current (AC) voltage which is in-phase with a voltage outputted from the oscillator 2. First and second coils (L1, L2) are in series and are connected at both ends thereof to output terminals of the current amplifier 4 and the offset voltage circuit part 6, respectively. First and second resistances (R1, R2) are in series and are connected in parallel to the first and second coils (L1, L2). First and second waveform selecting parts 8a, 8a= receive an alternating current (AC) voltage from a contact part (B) of the first and second resistances (R1, R2) and from a contact part (A) of the first and second coils (L1, L2), respectively, and then select and output a half-period of the AC voltage. First and second peak detectors 10a, 10a= detect a peak value of each output voltage of the first and second waveform selecting parts 8a, 8a=. A first differential amplifier 12a performs differential amplification by receiving voltages outputted through the first and second peak detectors 10a, 10a=. A first voltage-current converter 14a outputs a torque signal (Ts) by converting a voltage, which is outputted from the first differential amplifier 12a, into a current.

The torque sensor according to the embodiment of the present invention is configured to detect a fail-safe torque, as follows.

Third and fourth resistances (R1=, R2=) are in series and connected in parallel to the first and second coils (L1, L2). Third and fourth waveform selecting parts 8b, 8b= receive an AC voltage from a contact part (B=) of the third and fourth resistances (R1', R2') and a contact part (A) of the first and second coils (L1, L2), respectively, and then select and output a half-period of the AC voltage. Third and fourth peak detectors 10b, 10b= detect a peak value of each output voltage of the third and fourth waveform selecting parts 8b, 8b=. A second differential amplifier 12b executes differential amplification by receiving voltages outputted through the third and fourth peak detectors 10b, 10b=. A second voltage-current converter 14b outputs a torque signal (Ts=) by converting a voltage, which is outputted from second differential amplifier 12b, into a current. This fail-safe torque detecting structure is necessary to make a steering by using the detected torque signal (Ts=) thereof when an abnormality occurs to the torque signal (Ts).

Each of the first and second waveform selecting parts 8a, 8a=and each of the third and fourth waveform selecting parts 8b, 8b=can preferably be half-wave rectifier circuits.

The operation of the torque sensor according to the embodiment of the present invention will now be described with reference to drawings.

Figure 2:
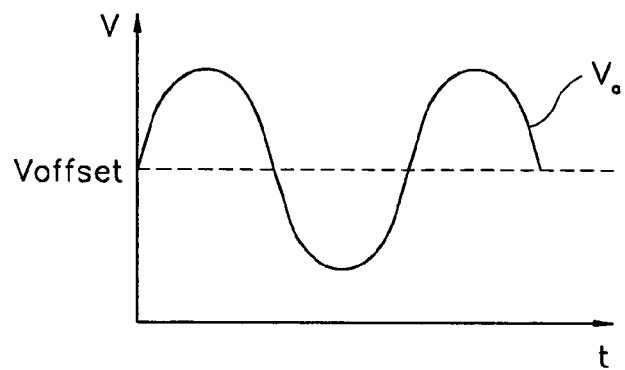
FIG. 2 illustrates a waveform of an output voltage of an oscillator according to an embodiment of the present invention.

As illustrated in FIG. 1, when power is provided from the power source (E) to the oscillator 2, an oscillating voltage of the oscillator 2 is applied to the current amplifier 4. An output waveform (Va) of the oscillator 2 is illustrated in FIG. 2.

Figure 3A:
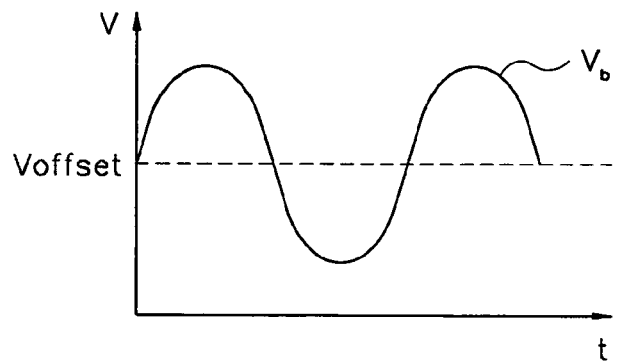
FIG. 3a illustrates a waveform of an output voltage of a current amplifier according to an embodiment of the present invention.
Figure 3B:
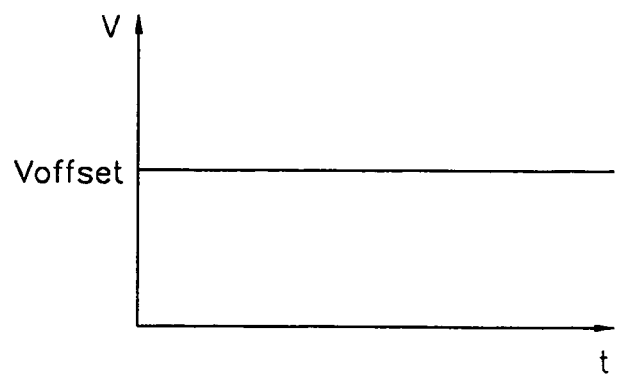
FIG. 3b illustrates a waveform of an output voltage of an offset voltage circuit part according to an embodiment of the present invention.

The current amplifier 4 outputs a direct current (DC) voltage (Voffset) and an AC voltage (Vb), which is in-phase with an output voltage of the oscillator 2, into a temperature correcting coil (L1, first coil) (see FIG. 3a). Simultaneously, a DC voltage (Voffset) is inputted into a torque detecting coil (L2, second coil) through the offset voltage circuit part 6 generating the offset voltage (Voffset) by using the power from power source (E) (see FIG. 3b).

Figure 4:
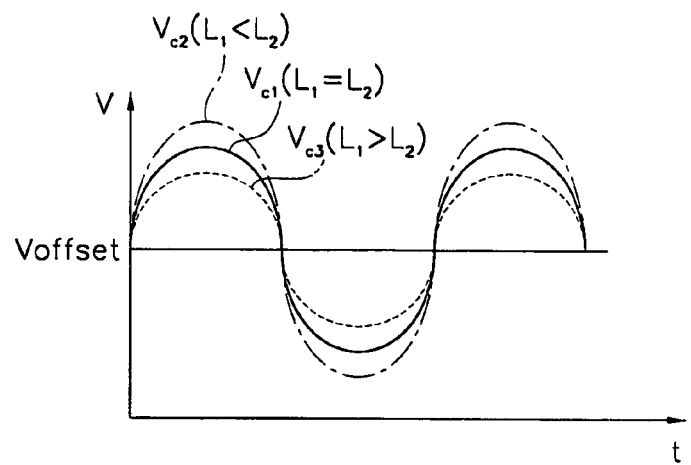
FIG. 4 illustrates a waveform of an output voltage of a first and second coil contact part according to an embodiment of the present invention.

The temperature correcting coil (L1, first coil) and torque detecting coil (L2, second coil) are connected in series between an output terminal of the current amplifier 4 and an output terminal of the offset voltage circuit part 6. An amplitude of an AC voltage of the contact part (A) between the temperature correcting coil (L1) and the torque detecting coil (L2) varies according to the difference between an inductance of the temperature correcting coil (L1) and an inductance of torque detecting coil (L2) (see FIG. 4).

The first and second resistances (R1, R2) are connected in parallel to the temperature correcting coil (L1) and the torque detecting coil (L2). If the values of the first and second resistances (R1, R2) are identical to each other, only the DC voltage (Voffset) is applied into the contact part (B). In case the third and fourth resistances (R1', R2') have an identical value, the voltage of the contact part (B=) and the voltage of the contact part (B) are identical.

Figure 5:
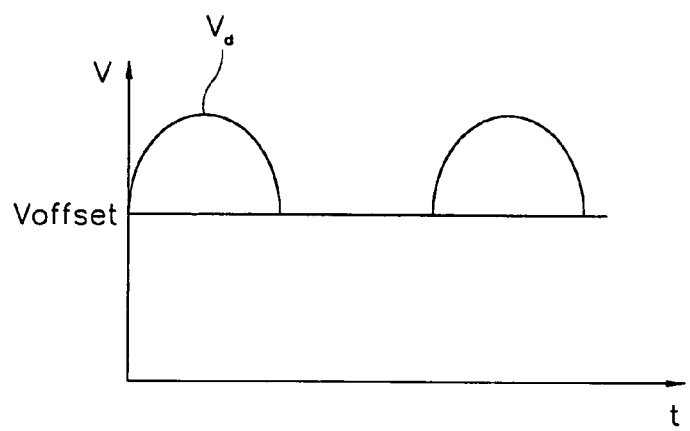
FIG. 5 illustrates a waveform of an output voltage from first, second, third and fourth waveform selecting parts according to an embodiment of the present invention.

Voltages of the contact parts (A, B) of the first and second coils (L1, L2) and the first and second resistances (R1, R2) are applied to the first waveform selecting part 8a and the second waveform selecting part 8a=, respectively. A signal waveform (Vd) outputted through the first and second waveform selecting parts 8a, 8a=is shown in FIG. 5. As shown in FIG. 5, the signals outputted through the first and second waveform selecting parts 8a, 8a=(half-wave rectifier circuits) are selected during only a half-period of the applied AC voltage.

Figure 6:
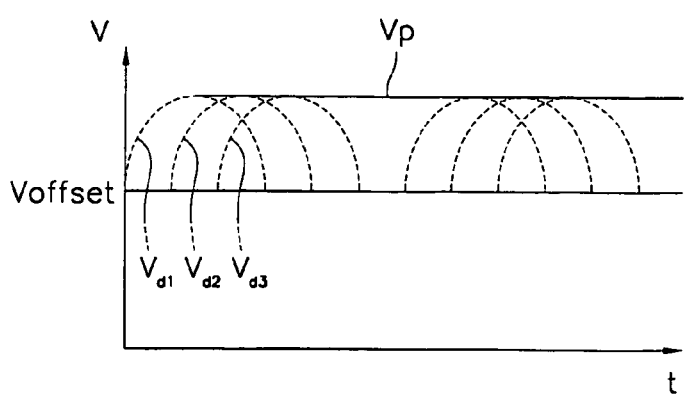
FIG. 6 illustrates a waveform of an output voltage from first, second, third and fourth peak detectors according to an embodiment of the present invention.

In reference to FIG. 6, the output signals from the first and second waveform selecting parts 8a and 8a=are applied into first and second peak detecting parts 10a, 10a=, respectively, to detect a peak value (Vp) of the applied AC signal (Vd1–Vd3). For overcoming a discordance with a sampling pulse generating circuit which conventionally occurs according to variations of amplitude and phase of coils (L1, L2) due to a temperature variation or the like, a rectification conversion of an AC signal from the oscillator 2 and a detection of a peak value of the rectified signal are pre-executed in the embodiment of the present invention.

A differential amplification is produced in the voltage supplied to the first differential amplifier 12a from the first and second peak detecting parts 10a, 10a=and then the differential amplified signal is outputted as a torque detecting signal (Ts) through the first voltage-current converter 14a. The outputted torque detecting signal is inputted into the Electronic Control Unit (ECU, not shown), thus a steering force is obtained by operating a motor according to the torque detecting signal (Ts).

In the fail-safe torque detecting sensor according to the embodiment of the present invention, operations of the third and fourth waveform selecting parts 8b, 8b=, the third and fourth peak detecting parts 10b, 10b=, the second differential amplifier 12b, and the second voltage-current converter 14b are identical to those of the main circuits of the torque detecting sensor described above. Therefore, the fail-safe torque detecting signal (Ts=) is employed to detect a torque in a fail-safe torque detecting sensor in case of an abnormality of the main torque detecting signal (Ts) or the like.

In order to prevent a distortion phenomenon of the outputted torque detecting signal even in cases phase and amplitude vary due to a temperature variation of the coil part (temperature correcting coil and torque detecting coil) of the torque sensor or the like, a rectification conversion through waveform selecting parts of the rectifier circuit and a peak value of a signal converted into rectification are detected after oscillating of the oscillator 2 by using the power supplied from the power source (E).

The technical concept is not limited to the embodiment of the present invention and should be determined by a logical interpretation within the scope of claims of the present invention.

As apparent from the foregoing, there is an advantage in the torque sensor for a vehicle steering system in that a distortion phenomenon of a torque detecting signal according to the phase variation in the coil part due to a temperature variation or the like is prevented.

What is claimed is:

1. A torque sensor for a vehicle steering system, comprising:
    a power source that supplies power;
    an oscillator that oscillates by receiving a voltage from said power source;
    an offset voltage circuit part that generates an offset voltage by using said voltage supplied from said power source;
    a current amplifier that outputs an alternating current voltage which is in-phase with a voltage outputted from said oscillator;
    first and second coils that are in series and connected at both ends thereof to output terminals of said current amplifier and said offset voltage circuit part, respectively;
    first and second resistances that are in series and connected in parallel to said first and second coils;
    first and second waveform selecting parts that receive an alternating current voltage from a contact part of said first and second resistances and from a contact part of said first and second coils, respectively, and then select and output a half-period of said alternating current voltage;
    first and second peak detectors that detect a peak value of each output voltage of said first and second waveform selecting parts;
    a first differential amplifier that executes differential amplification by receiving voltages outputted through said first and second peak detectors;
    a first voltage-current converter that outputs a torque signal by converting a voltage, which is outputted from said first differential amplifier, into a current; and
    third and fourth resistances being in series and connected in parallel to said first and second coils;
    third and fourth waveform selecting parts that receive an alternating current voltage from a contact part of said third and fourth resistances and from a contact part of said first and second coils, respectively, and then select and output a half-period of said alternating current voltage;
    third and fourth peak detectors that detect a peak value of each output voltage of said third and fourth waveform selecting parts;
    a second differential amplifier that executes differential amplification by receiving voltages outputted through said third and fourth peak detectors; and a second voltage-current converter that outputs a fail-safe torque signal by converting a voltage, which is outputted from said second differential amplifier, into a current.

2. The torque sensor as defined in claim 1, wherein each of said first, second, third and fourth waveform selecting parts include a half-wave rectifier circuit.

* * * * *